US 7,974,024 B2
(12) United States Patent
Ishimasa et al.

(10) Patent No.: US 7,974,024 B2
(45) Date of Patent: Jul. 5, 2011

(54) LENS DRIVING DEVICE

(75) Inventors: Toru Ishimasa, Kawasaki (JP); Satoko Uchikawa, Toda (JP)

(73) Assignee: Nidex Copal Corporation, Tokyo (JP)

( * ) Notice: Subject to any disclaimer, the term of this patent is extended or adjusted under 35 U.S.C. 154(b) by 62 days.

(21) Appl. No.: 12/514,181

(22) PCT Filed: Nov. 9, 2007

(86) PCT No.: PCT/JP2007/071784
§ 371 (c)(1),
(2), (4) Date: Aug. 28, 2009

(87) PCT Pub. No.: WO2008/056766
PCT Pub. Date: May 15, 2008

(65) Prior Publication Data
US 2010/0039717 A1 Feb. 18, 2010

(30) Foreign Application Priority Data

Nov. 10, 2006 (JP) ................. 2006-304844

(51) Int. Cl.
*G02B 7/02* (2006.01)
(52) U.S. Cl. ...................................... 359/823
(58) Field of Classification Search ............. 359/823
See application file for complete search history.

(56) References Cited

U.S. PATENT DOCUMENTS

| 5,177,638 | A | * | 1/1993 | Emura et al. ................. 359/704 |
| 5,715,481 | A | | 2/1998 | Ohmiya |
| 5,815,744 | A | | 9/1998 | Ohmiya |
| 5,832,317 | A | | 11/1998 | Shimizu |
| 6,232,697 | B1 | | 5/2001 | Mizumoto |
| 6,542,700 | B2 | * | 4/2003 | Ito .............................. 396/535 |

(Continued)

FOREIGN PATENT DOCUMENTS

JP 63-128514 8/1988

(Continued)

OTHER PUBLICATIONS

International Search Report issued Feb. 26, 2008 in International (PCT) Application No. PCT/JP2007/071784, filed Nov. 9, 2007.

(Continued)

*Primary Examiner* — Scott J Sugarman
*Assistant Examiner* — Vipin M Patel
(74) *Attorney, Agent, or Firm* — Wenderoth, Lind & Ponack, L.L.P.

(57) ABSTRACT

A lens drive apparatus includes a base, a lens frame, a nut movable with the lens frame while being threadably engaged with a lead screw, a main guide shaft for guiding the lens frame along an optical axis, an auxiliary guide shaft for guiding the lens frame along the optical axis while inhibiting the lens frame from rotating, and a cover, arranged so as to oppose the base for mating with and securing the main guide shaft and auxiliary guide shaft. The lens frame has a lens holding part projecting out of the base and cover. The base and cover have a first positioning pin and a first positioning hole, which are provided near the main guide shaft, and a second positioning pin and a second positioning hole, which are provided at a position distanced from the main guide shaft. The foregoing can yield a lens drive apparatus having high optical performances, which can be assembled with a high precision.

9 Claims, 12 Drawing Sheets

U.S. PATENT DOCUMENTS

| | | |
|---|---|---|
| 6,950,244 B2 | 9/2005 | Makii et al. |
| 7,265,480 B2 | 9/2007 | Sasaki |
| 7,457,060 B2 | 11/2008 | Paik et al. |
| 2005/0007679 A1 | 1/2005 | Makii et al. |
| 2005/0062346 A1 | 3/2005 | Sasaki |
| 2007/0195438 A1 | 8/2007 | Paik et al. |
| 2009/0073581 A1 | 3/2009 | Nuno |

FOREIGN PATENT DOCUMENTS

| | | |
|---|---|---|
| JP | 8-201673 | 8/1996 |
| JP | 9-197241 | 7/1997 |
| JP | 10-83014 | 3/1998 |
| JP | 2000-14176 | 1/2000 |
| JP | 2004-341392 | 12/2004 |
| JP | 2005-94957 | 4/2005 |
| JP | 2005-215080 | 8/2005 |
| JP | 2006-114117 | 4/2006 |
| JP | 2006-250976 | 9/2006 |
| JP | 2007-226234 | 9/2007 |

OTHER PUBLICATIONS

International Preliminary Report on Patentability issued Jun. 11, 2009 in International (PCT) Application No. PCT/JP2007/071784, filed Nov. 9, 2007.

* cited by examiner

LENS DRIVING DEVICE

BACKGROUND OF THE INVENTION

I. Technical Field

The present invention relates to a lens drive apparatus which employs a threaded engagement structure composed of a lead screw and a nut to drive a lens frame holding a lens along an optical axis.

II. Description of the Related Art

A conventional lens drive apparatus comprises a base, a lens frame holding a lens, two guide shafts which are secured to the base on both sides holding the lens so as to guide the lens frame along an optical axis, a motor secured to the base, a lead screw which is directly connected to the motor and driven thereby to rotate, a nut which is held by the lens frame so as to threadably engage the lead screw, a coil spring for urging the lens frame toward the nut, and the like as described in Japanese Patent Application Laid-Open No. 2004-34139 and Japanese Patent Application Laid-Open No. 2006-114117, for example. In such an apparatus, the motor rotates the lead screw, so as to screw-feed the nut, thereby moving the lens frame along the optical axis.

SUMMARY OF THE INVENTION

In the above-mentioned apparatus, the lens frame is formed substantially annular and holds the lens at its center, and the two guide shafts are formed so as to guide the lens frame along the optical axis while holding the lens therebetween. Therefore, positional deviations, vibrations, and the like of the lens frame do not become so problematic, whereby desirable optical performances can be secured.

However, there are cases where the lens cannot be arranged between the two guide shafts because of layout limitations and other conditions. An example of such cases is where the lens frame is elongated so as to extend in one direction, one side thereof is movably held by the two guide shafts, and the lens is held on the other side. In such a case, the lens frame is formed like a cantilever holding the lens on the free end side (the other end side mentioned above) distanced and biased from the two guide shafts. Consequently, the weight of the lens acts as a biased load at a position biased from the two guide shafts.

Therefore, when simply formed like a cantilever in a structure similar to the conventional one, the lens frame is hard to move smoothly along the guide shafts. As a result, desirable stable optical characteristics are hard to obtain.

In view of the foregoing circumstances, it is an object of the present invention to provide a lens drive apparatus which can drive a lens frame (lens) smoothly and stably along the optical axis without jouncing, tilting, sticking, vibrating, and so forth, even when the lens frame is formed like a cantilever and constructed to hold a lens on its free end side, and can drive the lens frame (lens) with a high precision along the optical axis when assembled with a high precision, while simplifying the structure, making the apparatus smaller, and so forth.

The lens drive apparatus in accordance with the present invention comprises a base; a lens frame for holding a lens; a driving source secured to the base; a lead screw driven by the driving source to rotate; a nut threadably engaged with the lead screw and held unrotatable and movable with the lens frame; a main guide shaft having one end part secured to the base such as to guide the lens frame along an optical axis; an auxiliary guide shaft having one end part secured to the base such as to guide the lens frame along the optical axis while inhibiting the lens frame from rotating about the main guide shaft; and a cover, arranged so as to oppose the base, for mating with and securing the other end parts of the main and auxiliary guide shafts; wherein the lens frame has a lens holding part for holding the lens on a free end side projecting from an outer contour defined by the base and cover; wherein, for positioning the base and cover with respect to each other upon assembling, one of the base and cover has a first positioning pin provided near the main guide shaft and a second positioning pin provided at a position distanced farther from the main guide shaft than is the first positioning pin; and wherein the other of the base and cover has a first positioning hole for mating with the first positioning pin and a second positioning hole for mating with the second positioning pin.

In this structure, when the lead screw is rotated by a rotary driving force of the driving source, the nut is screw-fed along the optical axis while being inhibited from rotating. Then, the lens frame formed like a cantilever holding the lens on its free end side is guided by the main guide shaft along the optical axis, so as to move together with the nut along the optical axis, while being restrained from rotating by the auxiliary guide shaft.

In the present invention, the base and cover are provided with the first positioning pin and first positioning hole to become a reference for positioning, while the second positioning pin and second positioning hole for absorbing manufacturing errors and the like and collaterally performing the positioning are provided at a position distanced from the main guide shaft. This can elongate the main guide shaft and auxiliary guide shaft in parallel with the optical axis, while preventing them from tilting. As a result, the lens drive apparatus of the present invention can be assembled with a high precision.

Also, the present invention can yield a lens drive apparatus having high optical performances, which can move the lens with a high precision along the optical axis without being affected by the biased load exerted by the lens. Since the lens is arranged on the outside of the base and cover, the degree of freedom in designing can be increased while enhancing optical performances.

In the structure mentioned above, the second positioning pin and second positioning hole may be provided near the auxiliary guide shaft.

This structure can position the auxiliary guide shaft with a higher precision and move the lens with a further higher precision along the optical axis.

In the above-mentioned structure, the lens frame may include a mating part for slidably mating with the main guide shaft, an engaging part for slidably engaging the auxiliary guide shaft, and the lens holding part formed on a side opposite from the engaging part so as to hold the mating part in a direction intersecting the optical axis.

In this structure, even when the lens frame is formed like a cantilever holding the lens on its free end side (lens holding part), the mating part to be guided by the main guide shaft is arranged on the side closer to the lens. This can minimize the sliding resistance caused by the biased load (bending moment) of the lens in the mating part. As a result, the lens frame can be moved smoothly.

In the above-mentioned structure, the lens holding part may be formed so as to position a center of the lens on or near a line connecting a center of the mating part and a center of the engaging part within a plane intersecting the optical axis.

In this structure, the lens holding part (the center of the lens) is positioned on or near a line connecting the mating part and the engaging part. Consequently, the biased load (bending moment) of the lens in a direction intersecting the line hardly acts on the main guide shaft (and mating part) or the auxiliary guide shaft (and engaging part). As a result, the lens frame can be moved more smoothly.

In the above-mentioned structure, the mating part may be formed such that a length thereof along the main guide shaft is longer than a distance from a center of the main guide shaft to a center of the lens held by the lens holding part.

In this structure, the length between both ends of the mating part mated with and guided by the main guide shaft is longer than the overhang amount of the lens (biased distance to the center where the biased load of the lens acts). Therefore, the mating part can slide more smoothly without sticking (scratching), chattering, and so forth with respect to the outer periphery of the main guide shaft. As a result, the lens frame can be moved smoothly with a high precision, whereby optical performances can be enhanced.

In the above-mentioned structure, the lead screw may be arranged between the main guide shaft and the auxiliary guide shaft.

In this structure, the driving force of the lead screw is exerted between the main guide shaft and the auxiliary guide shaft. Therefore, the driving force can be prevented from affecting the posture of the lens frame. As a result, the lens frame can be moved smoothly.

In the above-mentioned structure, the lead screw may be arranged such that a center thereof is positioned on or near a line connecting a center of the mating part and a center of the engaging part within a plane intersecting the optical axis.

In this structure, the center of the lead screw is positioned on or near a line connecting the mating part and the engaging part. This can prevent the driving force of the lead screw from acting on the main guide shaft (and mating part) or the auxiliary guide shaft (and engaging part) as a biased load (bending moment) in a direction intersecting the line. As a result, the lens frame can be moved more smoothly.

In the above-mentioned structure, the lead screw may be directly connected to the driving source.

This structure allows the center of gravity of the apparatus to be positioned between the main guide shaft and the auxiliary guide shaft or nearby, while making the apparatus smaller. Also, the weight balance of the apparatus can be set optimally even though the lens frame is formed like a cantilever.

The lens drive apparatus having the above-mentioned structure can drive a lens frame (lens) along the optical axis smoothly and stably with a high precision without jouncing, tilting, sticking, vibrating, and so forth even when the lens frame is formed like a cantilever and constructed to hold the lens on its free end, while simplifying the structure, making the apparatus smaller, and so forth.

DETAILED DESCRIPTION OF THE INVENTION

Figure 1:
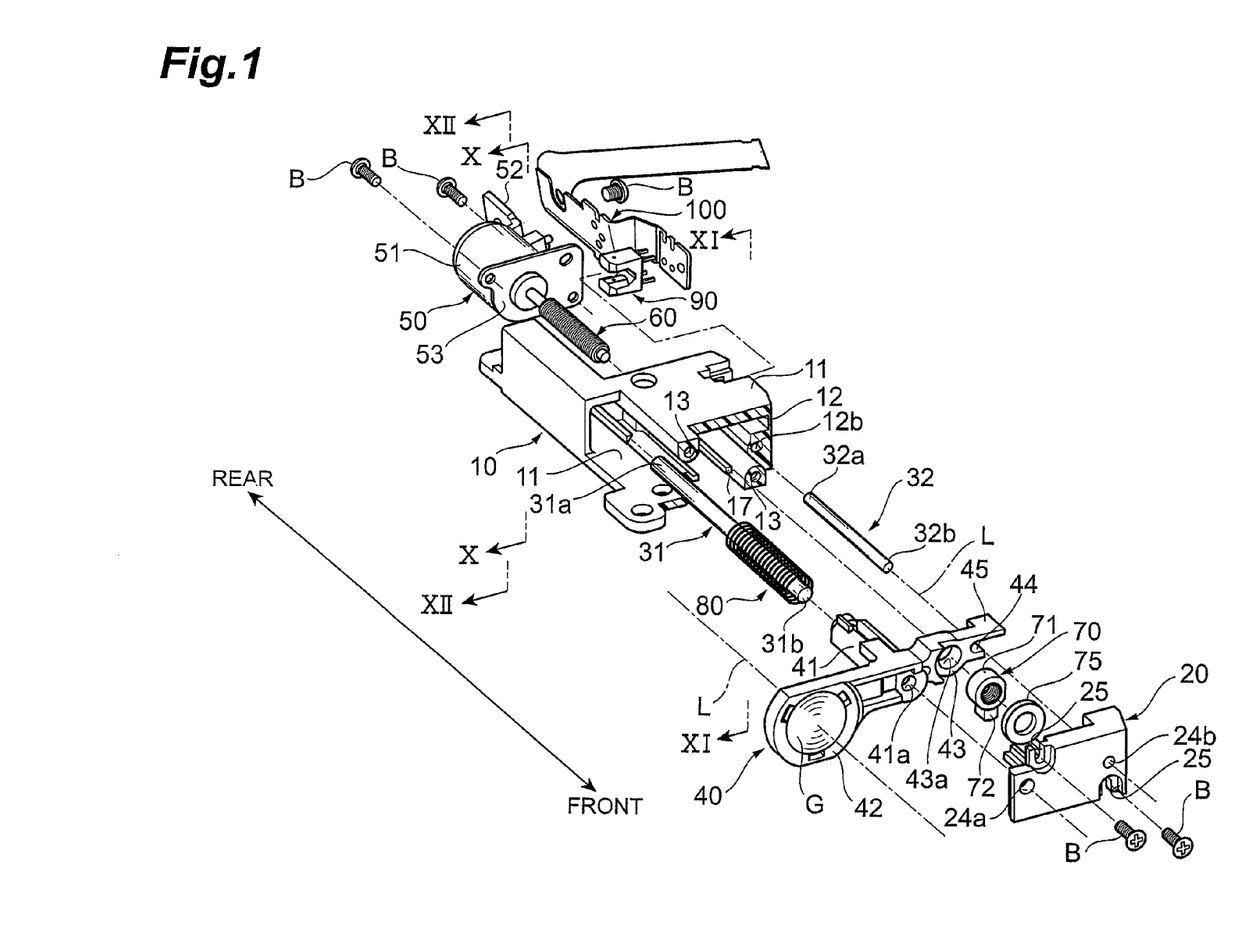
FIG. 1 is an exploded perspective view illustrating an embodiment of the lens drive apparatus in accordance with the present invention.
Figure 2:
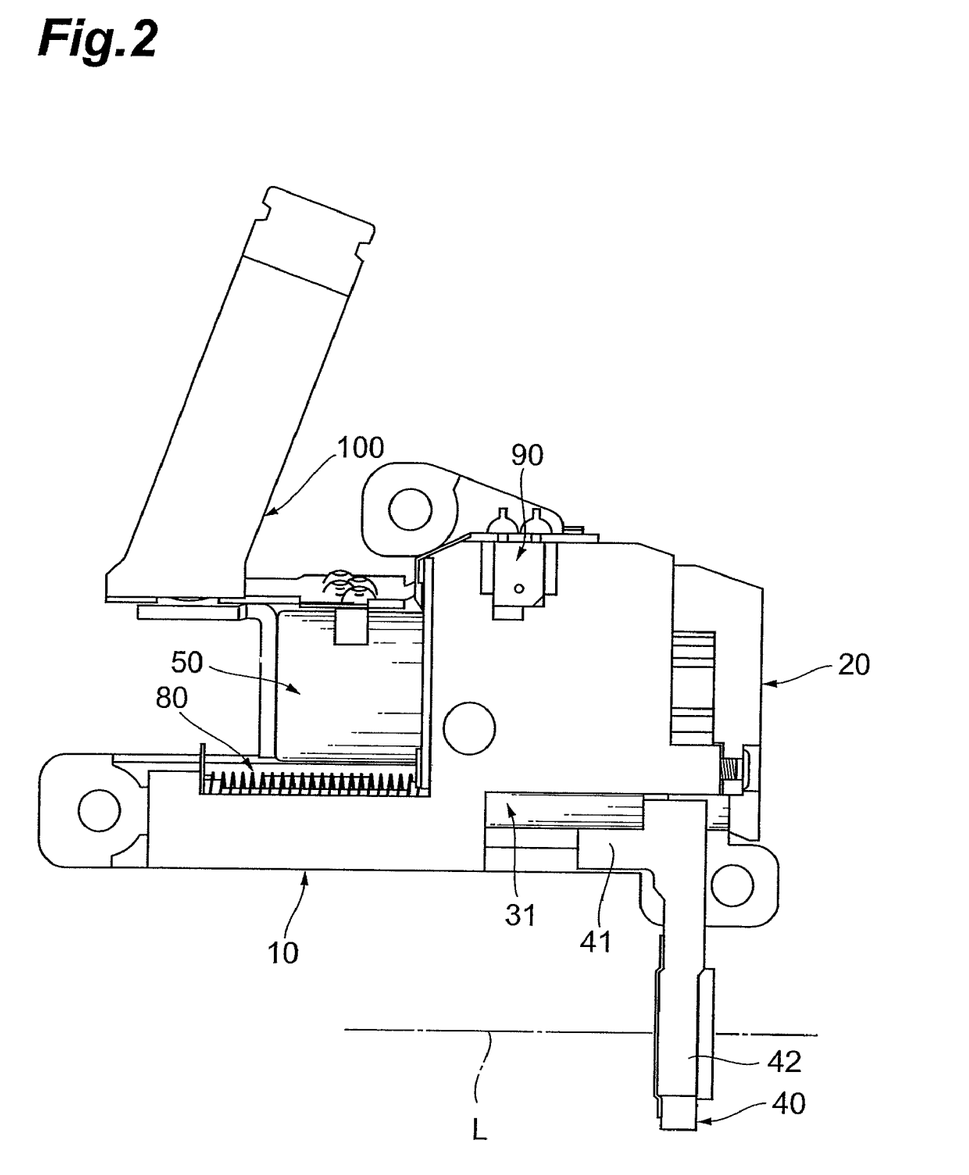
FIG. 2 is a side view of the lens drive apparatus illustrated in FIG. 1.
Figure 3:
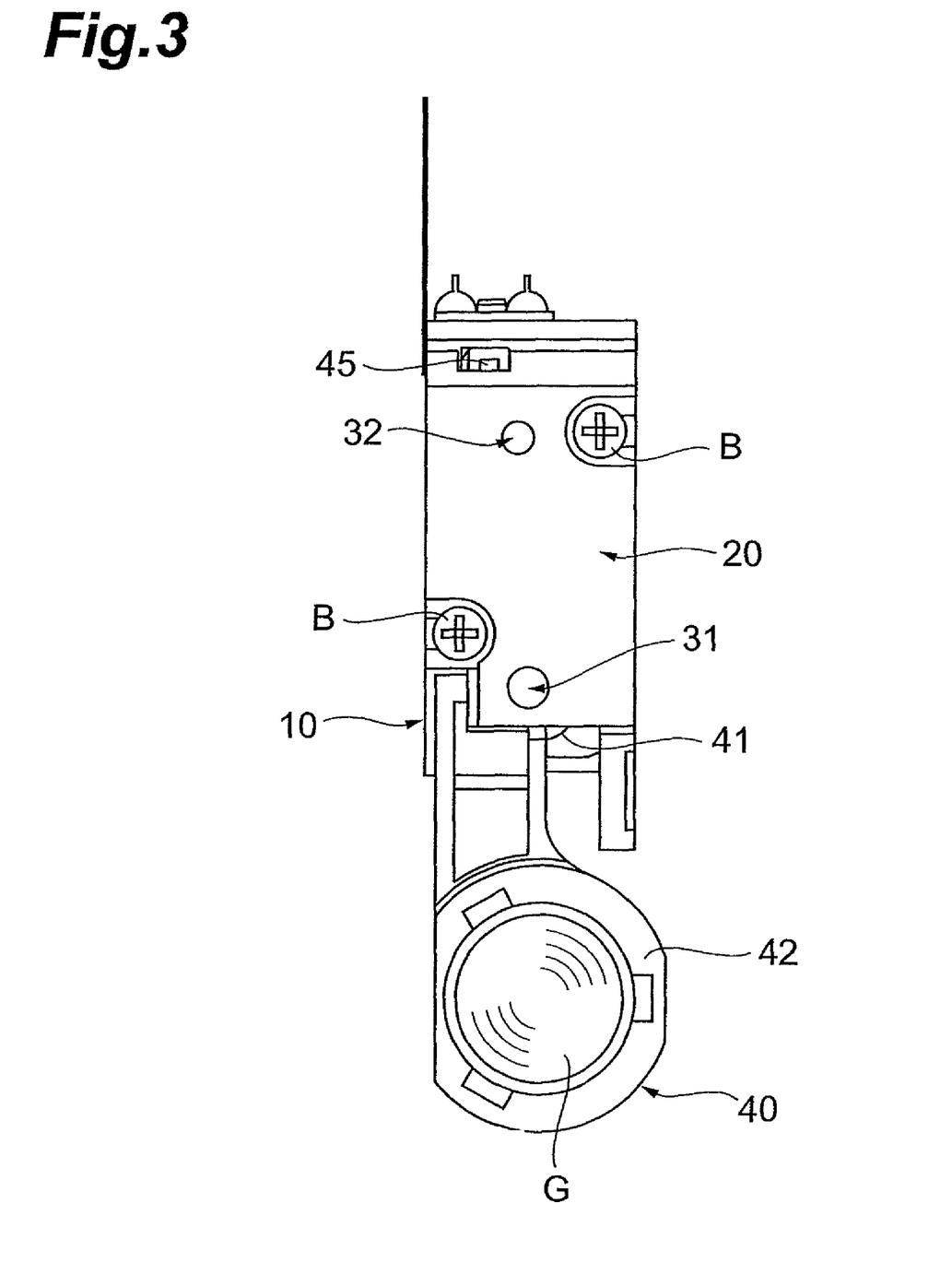
FIG. 3 is a front view of the lens drive apparatus illustrated in FIG. 1.
Figure 4:
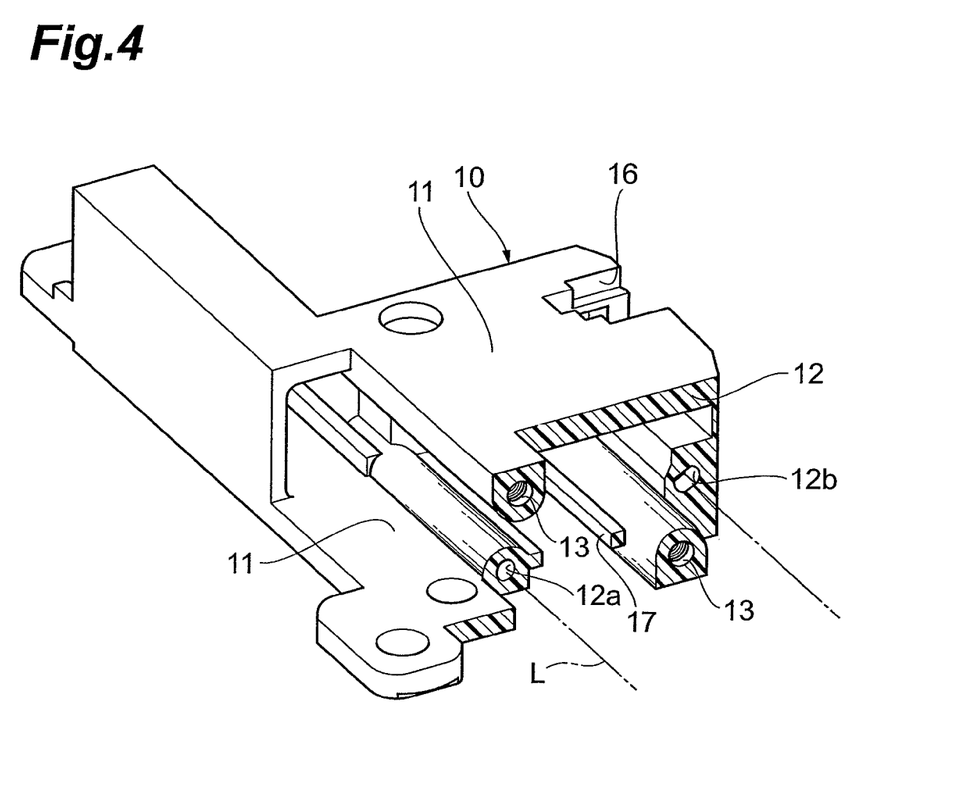
FIG. 4 is a perspective view illustrating a base constituting a part of the lens drive apparatus represented in FIG. 1.
Figure 5:
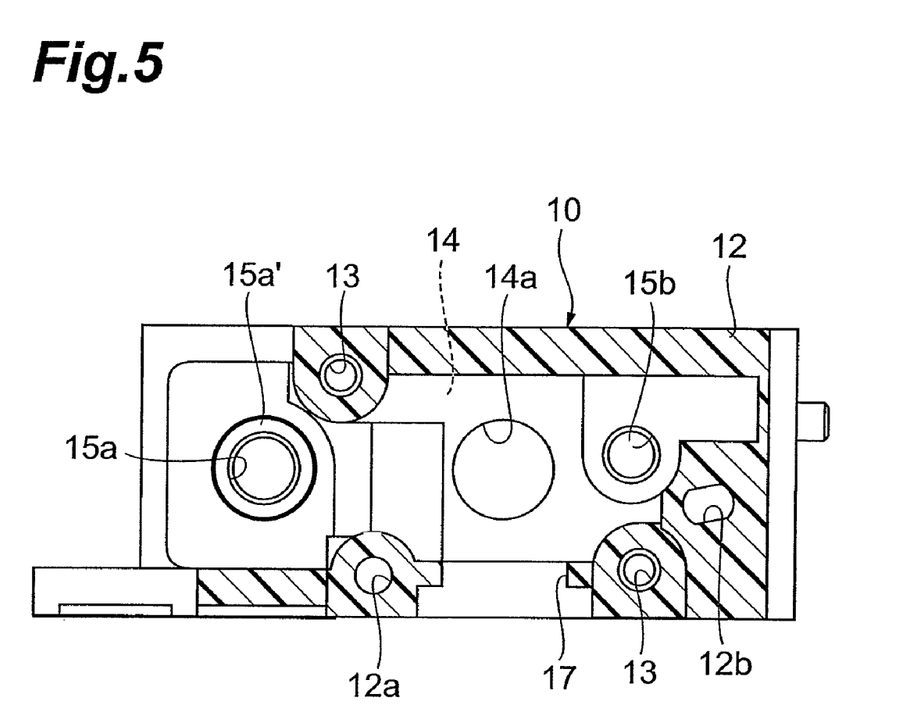
FIG. 5 is an end face view of the base illustrated in FIG. 4.
Figure 6:
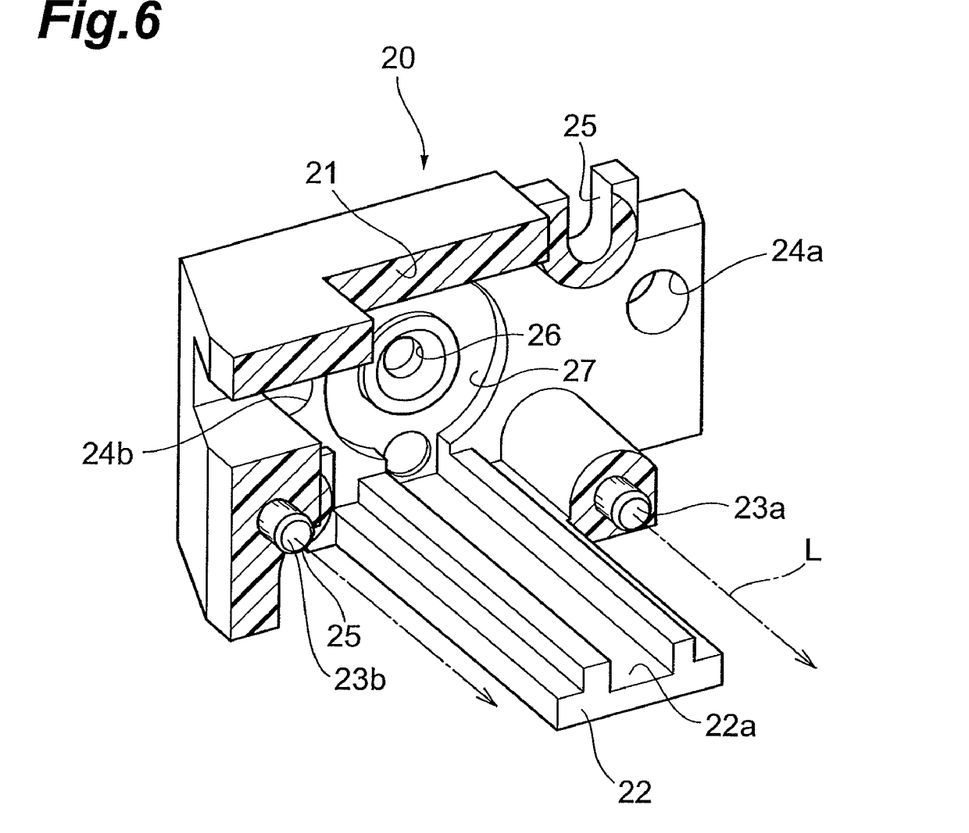
FIG. 6 is a perspective view illustrating a cover constituting a part of the lens drive apparatus represented in FIG. 1.
Figure 7:
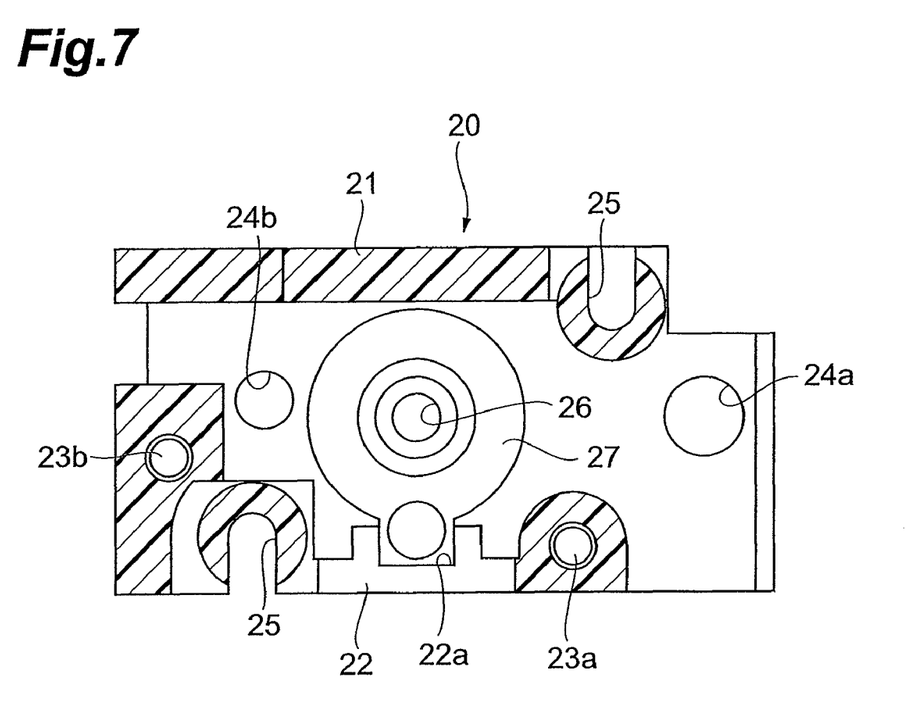
FIG. 7 is an end face view of the cover illustrated in FIG. 6.
Figure 8:
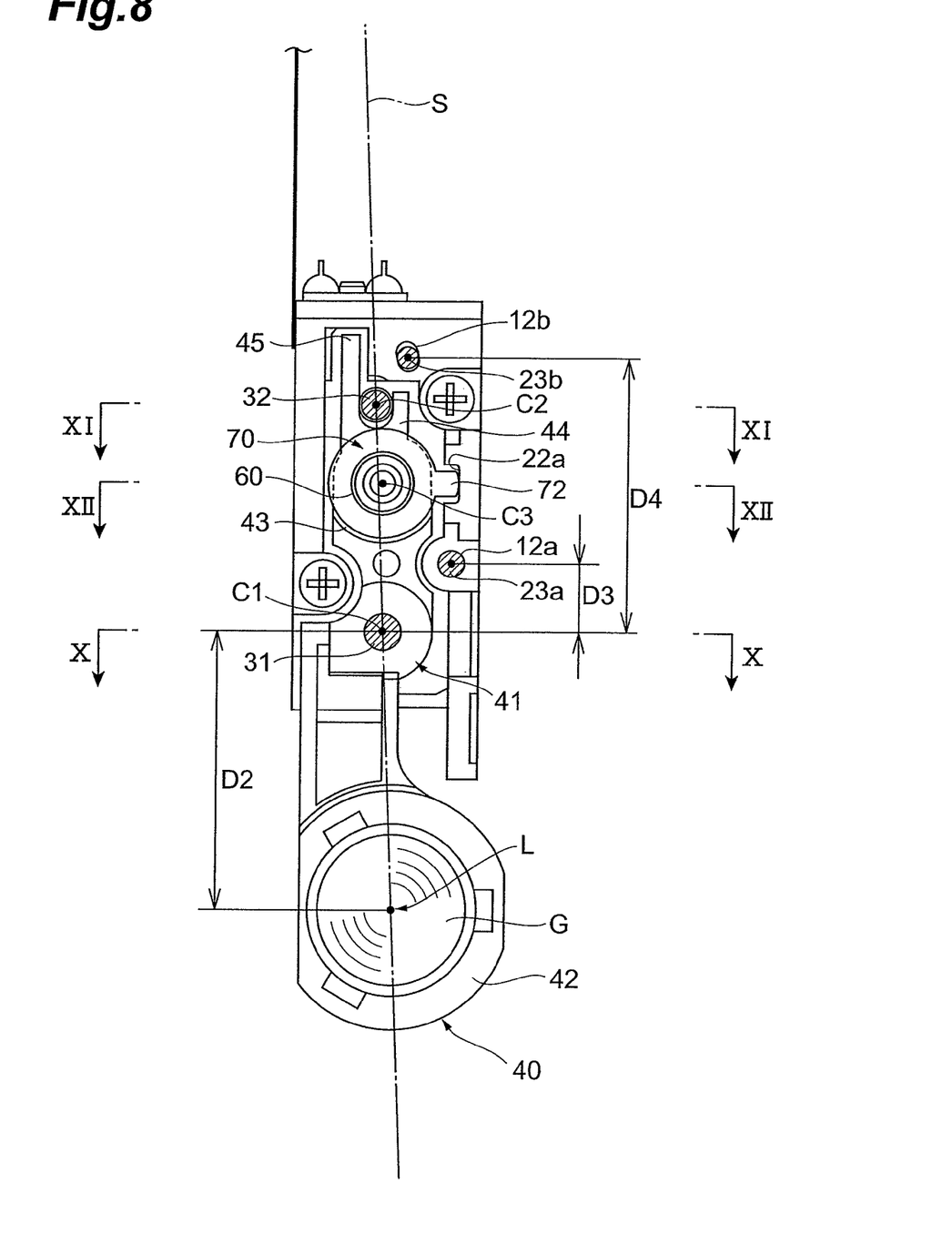
FIG. 8 is a front view illustrating an arrangement relationship in the lens drive apparatus represented in FIG. 1.
Figure 9:
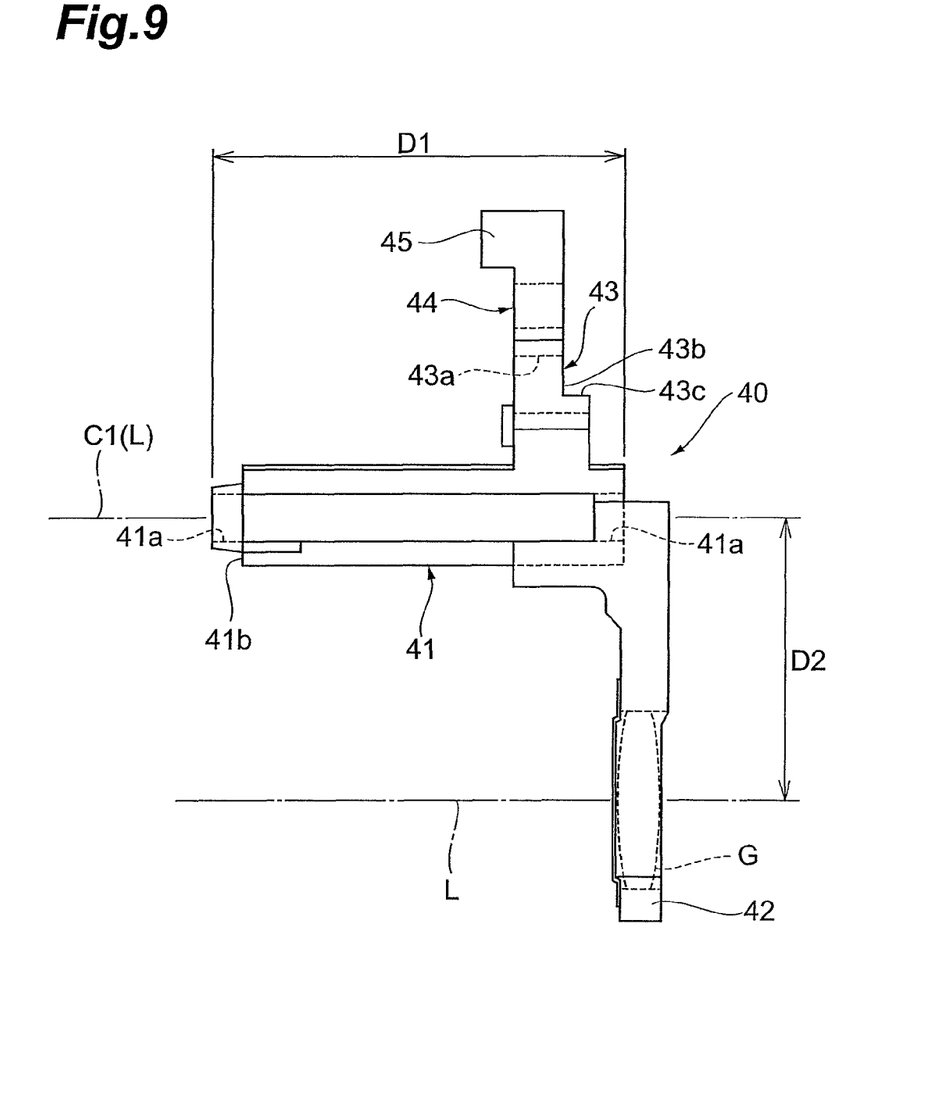
FIG. 9 is a side view illustrating a lens frame constituting a part of the lens drive apparatus represented in FIG. 1.
Figure 10:
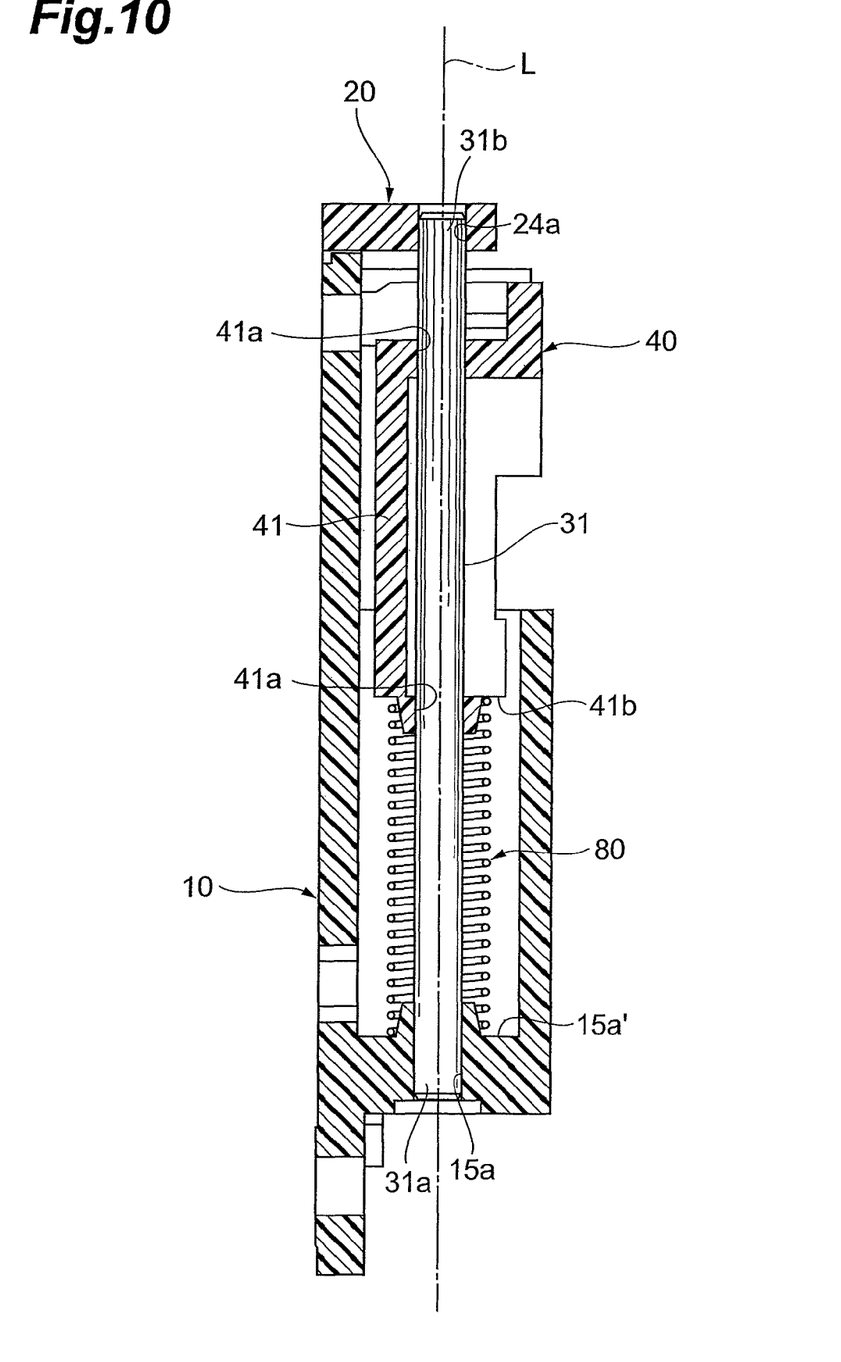
FIG. 10 is a longitudinal sectional view illustrating the interior of the lens drive apparatus represented in FIG. 1.
Figure 11:
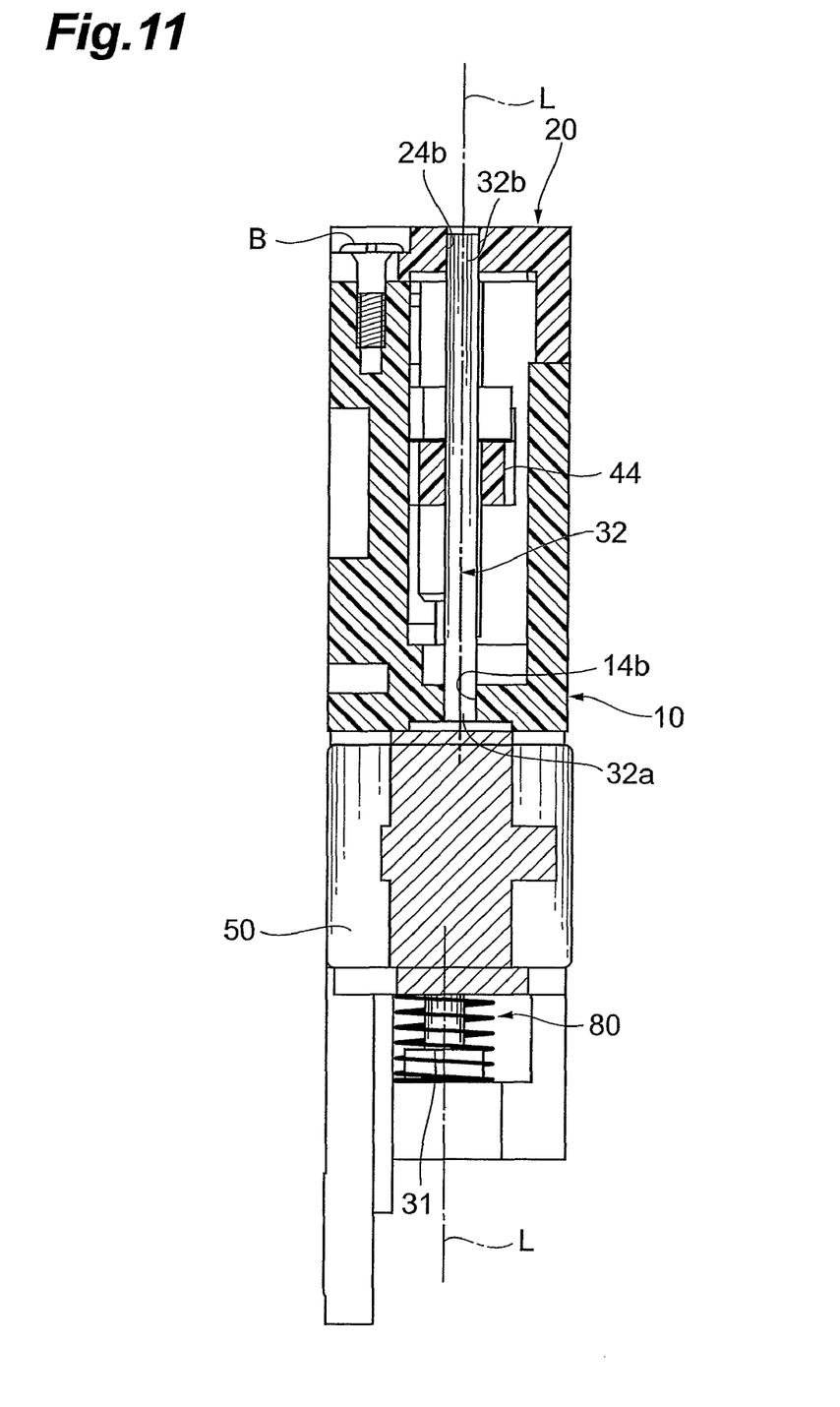
FIG. 11 is a longitudinal sectional view illustrating the interior of the lens drive apparatus represented in FIG. 1.
Figure 12:
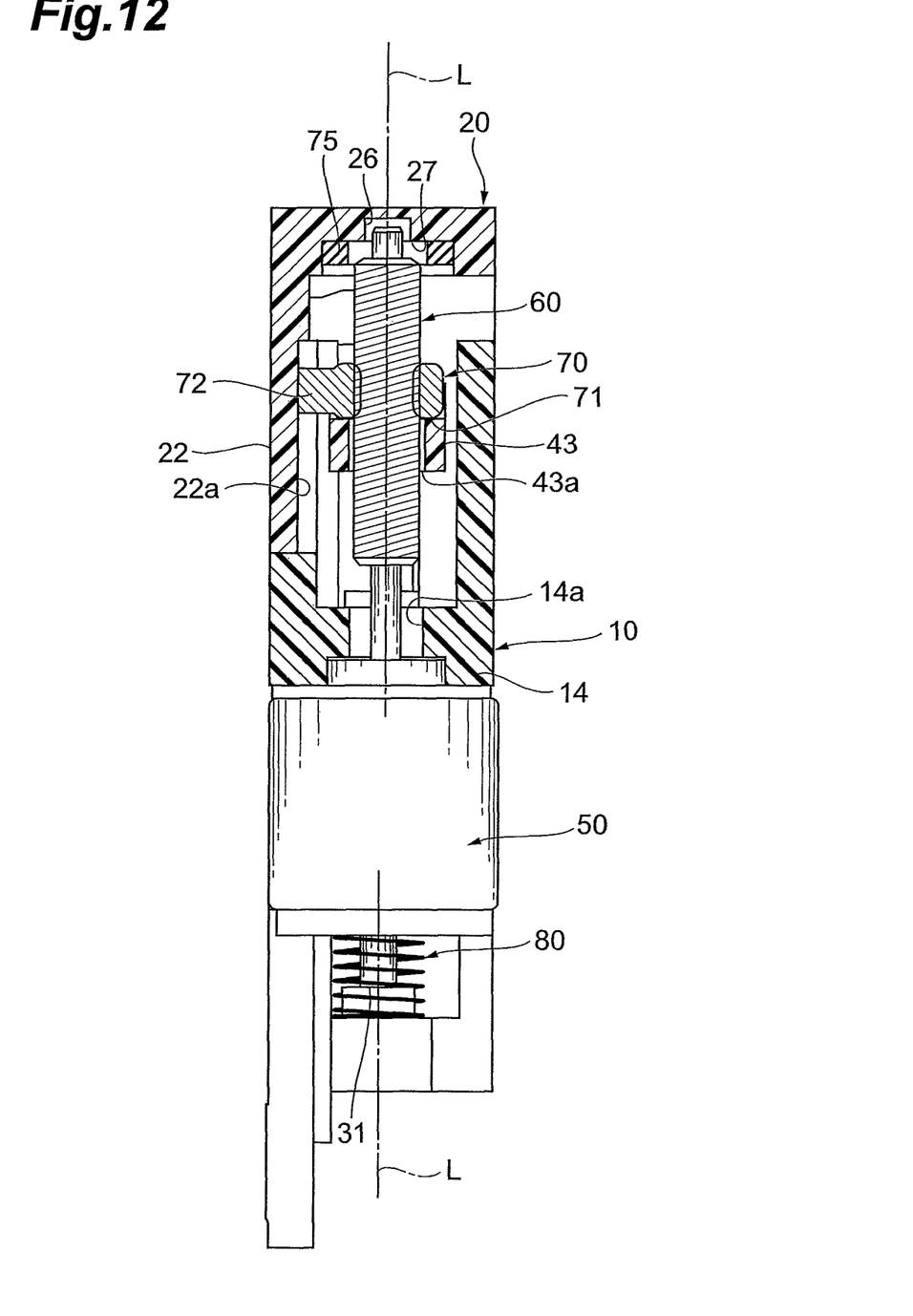
FIG. 12 is a longitudinal sectional view illustrating the interior of the lens drive apparatus represented in FIG. 1.

In the following, the best embodiment of the present invention will be explained with reference to the accompanying drawings. FIGS. 1 to 12 illustrate an embodiment of the lens drive apparatus in accordance with the present invention, in which FIG. 1 is an exploded perspective view of the apparatus, FIG. 2 is a side view of the apparatus, FIG. 3 is a front view of the apparatus, FIGS. 4 and 5 are perspective and end face views of a base constituting a part of the apparatus, FIGS. 6 and 7 are perspective and end face views of a cover constituting a part of the apparatus, FIG. 8 is a front view illustrating an arrangement relationship of the apparatus, FIG. 9 is a side view of a lens frame constituting a part of the apparatus, and FIGS. 10 to 12 are longitudinal sectional views of the apparatus. The cross-sectional directions of FIGS. 10 to 12 are illustrated in FIGS. 1 and 8.

About Overall Structure and Constituents of Apparatus

First, the overall structure of the lens drive apparatus in accordance with the present invention and its constituents will be explained. The following explanation will easily be understood with reference to FIGS. 1 to 12.

As illustrated in FIG. 1, the apparatus comprises a base 10, a cover 20 opposed and connected to the base 10, a main guide shaft 31 and an auxiliary guide shaft 32 which are secured to the base 10 and extend along an optical axis L, a lens frame 40 which holds a lens G and is supported by the main guide shaft 31 and auxiliary guide shaft 32 so as to be movable along the optical axis L, a motor 50 as a driving source secured to the base 10, a lead screw 60 which is directly connected to the motor 50 and extends along the optical axis L, a nut 70 which threadably engages the lead screw 60 and abuts against the lens frame 40, a coil spring 80 which urges the lens frame 40 toward the nut 70, a detection sensor 90 for detecting an initial position of the lens frame 40, a wiring board 100 attached to the motor 50, and the like.

As illustrated in FIGS. 1, 4, and 5, the base 10, which is molded by a resin material, comprises a pair of side wall parts 11 extending along the optical axis L and defining an inner space, an end face part 12 which opens on the front side of the optical axis L so as to join with the cover 20, a first positioning hole 12a, a second positioning hole 12b, two screw holes 13, a bottom part 14 (FIG. 5) which secures the motor 50, a through hole 14a which is formed on the bottom part 14 so as to pass the lead screw 60 therethrough, a mating hole 15a into which one end part 31a of the main guide shaft 31 is pressed and secured, a mating hole 15b into which one end part 32a of the auxiliary guide shaft 32 is pressed and secured, a seating surface part 15a' which is formed about one mating hole 15a so as to receive one end part of the coil spring 80, a receptacle 16 (FIG. 4) forming a substantially rectangular opening to which the detector sensor 90 is attached, a slit 17 formed in one side wall part 11, various attachment flanges, and the like. The specification refers to the cover 20 side as "the front side" or "the front side of the optical axis L" and the base 10 side as "the rear side" or "the rear side of the optical axis L" in the whole apparatus for convenience of explanation as illustrated in FIG. 1, for example.

The first positioning hole 12a, which is formed circular, becomes a positioning reference by mating with a first positioning pin 23a of the cover 20, which will be explained later, when assembling the base 10 and the cover 20 together. The second positioning hole 12b, which is formed as an elongated hole, absorbs manufacturing errors and the like and collaterally performs the positioning by mating with a second positioning pin 23b of the cover 20, which will be explained later, when assembling the base 10 and the cover 20 together.

The cover 20 is molded by a resin material, so as to extend in directions substantially perpendicular to the optical axis L and cover an inner space defined by the base 10, thereby exhibiting a substantially planar form as illustrated in FIGS. 1, 6, and 7. The cover 20 comprises an end face part 21 which joins with the end face part 12 of the base 10, an extension 22 which extends along the optical axis L from the end face part 21 so as to fit into the slit 17 formed in the side wall part 11 of the base 10, a guide groove 22a which is formed in the extension 22 so as to extend along the optical axis L and guides a projection 72 of the nut 70 which will be explained later, the first positioning pin 23a projecting from the end face part 21 along the optical axis L so as to fit into the first positioning hole 12a of the base 10, the second positioning pin 23b projecting from the end face part 21 along the optical axis L so as to fit into the second positioning hole 12b of the base 10, a mating hole 24a for mating with the other end part 31b of the main guide shaft 31, a mating hole 24b for mating with the other end part 32b of the auxiliary guide shaft 32, two cutouts 25 for passing screws B therethrough corresponding to the two screw holes 13 (FIG. 1) of the base 10, a depression 26 for receiving the leading end part of the lead screw 60 in a noncontact manner, a depression 27 to be filled with a cushion member 75 which will be explained later, and the like.

The first positioning pin 23a, which is formed cylindrical, becomes a positioning reference by fitting into the first positioning hole 12a of the base 10 when assembling the base 10 and the cover 20 together. The second positioning pin 23b, which is formed cylindrical, absorbs manufacturing errors and the like and collaterally performs the positioning by fitting into the second positioning hole 12b of the base 10 when assembling the base 10 and the cover 20 together.

As illustrated in FIGS. 1 and 10, the main guide shaft 31 is formed so as to extend along the optical axis L by a metal material having a circular cross section. One end part 31a of the main guide shaft 31 is pressed and secured into the mating hole 15a of the base 10, while the other end part 31b fits into the mating hole 24a of the cover 20. The main guide shaft 31 slidably mates with a mating part 41 of the lens frame 40, which will be explained later, so as to guide the lens frame 40 along the optical axis L.

As illustrated in FIGS. 1 and 11, the auxiliary guide shaft 32 is formed so as to extend along the optical axis L by a metal material having a circular cross section. One end part 32a of the auxiliary guide shaft 32 is pressed and secured into the mating hole 15b of the base 10, while the other end part 32b fits into the mating hole 24b of the cover 20. The auxiliary guide shaft 32 slidably engages an engaging part 44 of the lens frame 40, which will be explained later, so as to guide the lens frame 40 along the optical axis L, while inhibiting the lens frame 40 from rotating about the main guide shaft 31.

FIG. 8 illustrates positional relationships between the pair of the first positioning pin 23a and first positioning hole 12a, the pair of the second positioning pin 23b and second positioning hole 12b, the main guide shaft 31, and the auxiliary guide shaft 32. As illustrated in FIG. 8, the first positioning pin 23a and first positioning hole 12a to become a positioning reference are provided near the main guide shaft 31. The second positioning pin 23b and second positioning hole 12b for absorbing manufacturing errors and the like and collaterally performing the positioning are provided near the auxiliary guide shaft 32 at a position distanced from the main guide shaft 31. That is, as illustrated in FIG. 8, a distance D3 corresponding to the distance from the main guide shaft 31 to the first positioning pin 23a (first positioning hole 12a) is made shorter than a distance D4 corresponding to the distance from the main guide shaft 31 to the second positioning pin 23b (second positioning hole 12b).

The foregoing can elongate the main guide shaft 31 and auxiliary guide shaft 32 in parallel with the optical axis L while preventing them from tilting when assembling the cover 20 in a state where one end part 31a of the main guide shaft 31 and one end part 32a of the auxiliary guide shaft 32 are secured to the base 10. As a result, the apparatus can be assembled with a high precision. Therefore, the lens frame 40 (lens G), which will be explained later, can be moved along the optical axis L with a high precision without being affected by the biased load exerted by the lens G, whereby a lens drive apparatus having high optical performances can be obtained.

The second positioning pin 23b and second positioning hole 12b are arranged near the auxiliary guide shaft 32. Therefore, when assembling the base 10 and the cover 20 together, the auxiliary guide shaft 32 can be positioned with a higher precision, whereby the lens frame 40 (lens G), which will be explained later, can be moved along the optical axis L with a further higher precision.

The lens frame 40, which is formed by a resin material, comprises the mating part 41, a seating surface part 41b, a lens holding part 42, a nut holding part 43, the engaging part 44, a piece to be detected 45, and the like as illustrated in FIGS. 1 to 3, 8, and 9. As illustrated in FIG. 9 in particular, the mating part 41 is formed so as to extend along the optical axis L and define a mating hole 41a into which the main guide shaft 31 slidably fits. The seating surface part 41b is formed at a lower end of the mating part 41 so as to receive the other end part of the coil spring 80. The lens holding part 42, which is formed annular, extends from the mating part 41 in one radial direction (direction perpendicular to the optical axis L) and holds the lens G on its free end side. The nut holding part 43 extends in a direction different from the direction in which the lens holding part 42 extends from the mating part 41, while having a flat surface 43b for abutting against an end face 71 of the nut 70 which will be explained later and a through hole 43a for passing the lead screw 60 therethrough in a noncontact manner. The engaging part 44, which is substantially shaped like letter U, is formed adjacent to the nut holding part 43 and slidably engages the auxiliary guide shaft 32. The piece to be detected 45 is formed so as to extend from the engaging part 44 in a direction perpendicular to the optical axis L, in order to be detected by the detection sensor 90.

That is, the mating part 41 is guided along the optical axis L by the main guide shaft 31, and the engaging part 44 is guided along the optical axis L while being inhibited from rotating by the auxiliary guide shaft 32, so that the lens frame 40 is formed like a cantilever holding the lens G with the lens holding part 42 on the free end side projecting from an outer contour defined by the base 10 and cover 20.

In a state where the end face 71 of the nut 70, which will be explained later, threadably engaging the lead screw 60 abuts against the flat surface 43b of the nut holding part 43, the lens frame 40 detachably holds the nut 70 along the optical axis L against the urging force of the coil spring 80 while keeping the noncontact state between the outer periphery of the nut 70 and an end face 43c of the nut holding part 43.

The lens frame 40 is formed such as to place the lens G on the outside of the base 10 and cover 20 as mentioned above, and thus can increase the degree of freedom in designing while enhancing optical performances.

As illustrated in FIG. 8, the engaging part 44 and the lens holding part 42 are arranged opposite from each other so as to hold the mating part 41 therebetween in a direction (e.g., direction in which a line S extends) perpendicular to the optical axis L in the lens frame 40. That is, even when the lens frame 40 is formed like a cantilever holding the lens G on its free end side (lens holding part 42), the sliding resistance exerted on the mating part 41 (mating hole 41a) by the biased load (bending moment) of the lens G can be minimized, since the mating part 41 guided by the main guide shaft 31 is arranged on the side closer to the lens G. Consequently, the lens frame 40 can smoothly move along the optical axis L.

In the lens frame 40, as illustrated in FIG. 8, the lens holding part 42 is formed such that the center L of the lens G is positioned on or near the line S. The line S in FIG. 8 is a line connecting a center C1 of the mating part 41 (main guide shaft 31) and a center C2 of the engaging part 44 (auxiliary guide shaft 32) within a plane (paper surface) perpendicular to the optical axis L. Here, letter L indicates not only the center of the lens G but also the optical axis. Since the lens holding part 42 (the center L of the lens G) is thus positioned on or near the line S, the biased load (bending moment) of the lens G in a direction perpendicular to the line S hardly acts on the main guide shaft 31 (and mating part 41) or the auxiliary guide shaft 32 (and engaging part 44), whereby the lens frame 40 can move more smoothly.

As illustrated in FIG. 9, the lens frame 40 is formed such that a length D1 of the mating part 41 along the main guide shaft 31 is longer than a distance D2 from the center C1 of the main guide shaft 31 to the center L of the lens G. That is, the length D1 between both ends of the mating part 41 mated with and guided by the main guide shaft 31 is longer than the overhang amount (biased distance to the center L where the biased load of the lens G acts) D2 of the lens G. Therefore, the mating part 41 can slide more smoothly without sticking (scratching), chattering, and so forth with respect to the outer periphery of the main guide shaft 31. As a result, the lens frame 40 can be moved smoothly with a high precision, whereby optical performances can be enhanced.

The motor 50, which includes a stepping motor stepwise rotatable at predetermined angular increments, is secured to the bottom part 14 of the base 10 with screws B as illustrated in FIGS. 1 and 12. The motor 50 exerts a rotary driving force on the lead screw 60 directly connected thereto. The motor 50 may further include a case 51, a rear flange 52, and a front flange 53 as illustrated in FIG. 1 in particular. The rear flange 52 and front flange 53 may be constituted by a thin metal sheet, for example. In this case, the rear flange 52 and front flange 53 can serve as a radiator panel for dissipating the heat generated by the stepping motor within the motor 50.

The lead screw 60, which is made of a metal material, is formed so as to extend along the optical axis L as illustrated in FIGS. 1, 8, and 12. The lead screw 60 is also formed such as to have one end part directly connected to the motor 50 and the other end part entering the depression 26 of the cover 20 in a noncontact manner.

As illustrated in FIG. 8, the lead screw 60 is arranged between the main guide shaft 31 and the auxiliary shaft 32 within a plane (paper surface) perpendicular to the optical axis L. Consequently, the driving force of the lead screw 60 is exerted on the lens frame 40 while being held between the main guide shaft 31 and the auxiliary guide shaft 32. This can prevent the driving force from affecting the posture of the lens frame and move the lens frame 40 smoothly along the optical axis L.

As illustrated in FIG. 8, the lead screw 60 is arranged such that its center C3 is positioned on or near the line S. This line S is a line connecting the center C1 of the mating part 41 (main guide shaft 31) and the center C2 of the engaging part 44 (auxiliary guide shaft 32) as mentioned above. This can prevent the driving force of the lead screw 60 from acting on the main guide shaft 31 (and mating part 41) or the auxiliary guide shaft 32 (and engaging part 44) as the biased load (bending load) in a direction perpendicular to the line S. As a result, the lens frame 40 can be moved along the optical axis L more smoothly.

The lead screw 60 is directly connected to the motor 50 as illustrated in FIGS. 1 and 12 and thus can make the apparatus smaller. Also, the center of gravity of the apparatus can be positioned between the main guide shaft 31 and the auxiliary guide shaft 32 or nearby, whereby the weight balance of the apparatus can be set optimally even though the lens frame 40 is formed like a cantilever.

The nut 70, which is made of a metal material, comprises the end face 71, the projection 72, and the like as illustrated in FIGS. 1, 8, and 12. While threadably engaging the lead screw 60, the end face 71 abuts against the nut holding part 43 of the lens frame 40 along the optical axis L. The projection 72 radially projects from the outer periphery of the nut 70 and enters the guide groove 22a of the cover 20, thereby being inhibited from rotating. The projection 72 is formed by such a width that the nut 70 is kept from rotating about the lead screw 60 and jouncing. The projection 72 is also formed such as to be movable longitudinally of the guide groove 22a (along the optical axis L).

The cushion member 75 is formed annular by using an elastic material such as rubber, and fits into the depression 27 of the cover 20 as illustrated in FIG. 1. The cushion member 75 aims to prevent the nut 70 from directly colliding against the cover 20 when moving forward to the maximum along the optical axis L.

As illustrated in FIGS. 1 and 10, the coil spring 80 fits onto the main guide shaft 31. The coil spring 80 is mounted in a state compressed to a predetermined compression allowance, while having one end part abutting against the seating surface part 15a' of the base 10 and the other end part abutting against the seating surface part 41b of the lens frame 40. Therefore, the coil spring 80 exerts such an urging force as to urge the lens frame 40 forward along the optical axis L and press the nut holding part 43 of the lens frame 40 against (the end face 71 of) the nut 70.

The detection sensor 90, which is a transmission-type photosensor having a light-emitting device and a light-receiving device, detects an initial position (home position) of the lens frame 40 according to whether the piece to be detected 45 of the lens frame 40 exists or not.

The wiring board 100 is a flexible substrate which is elastically deformable. Wires for feeding electric power required for driving the motor 50, wires required for detecting a signal of the detection sensor 90, and the like are applied to or embedded in the wiring board 100. The wiring board 100 is electrically connected to the motor 50. The wiring board 100 is secured to the case 51 of the motor 50 with a screw B. This enhances the structural strength and improves the durability as compared with the case where the wiring board 100 and the motor 50 are secured to each other with an adhesive or soldering alone.

About Assembling of the Apparatus

Assembling of the apparatus will now be explained. The following explanation will easily be understood by mainly referring to FIG. 1.

First, the motor 50 having the lead screw 60 directly connected thereto and the wiring board 100 attached thereto is fastened with the screws B to the bottom part 14 of the base 10. Also, (one end part 31a of) the main guide shaft 31 and (one end part 32a of) the auxiliary guide shaft 32 are pressed and secured into (the mating holes 15a, 15b) of the base 10. Further, the detection sensor 90 is assembled and secured to the receptacle 16 of the base 10.

Subsequently, the coil spring 80 is fitted onto the main guide shaft 31, so that its one end part is seated on the seating surface part 15a'. Next, the lens frame 40 is caused to approach from the front side along the optical axis L, so that the seating surface part 41b compresses the other end part of the coil spring 80. At the same time, the main guide shaft 41 is slidably inserted through the mating part 41, and the auxiliary guide shaft 32 is slidably inserted through the engaging part 44. Further, the lead screw 60 is held in a state inserted through the through hole 43a in a noncontact manner.

Subsequently, the nut 70 is caused to approach from the front side along the optical axis L, so as to threadably engage the lead screw 60 and move to a predetermined depth (toward the rear side along the optical axis L).

After orienting the projection 72 of the nut 70 to a predetermined direction, the lens frame 40 is once released from the above-mentioned compression. Then, the urging force of the coil spring 80 moves the lens frame 40 forward along the optical axis L, whereby its nut holding part 43 abuts against the end face 71 of the nut 70.

Subsequently, the cover 20 is caused to approach from the front side along the optical axis L, so that the projection 72 of the nut 70 enters the guide groove 22a. At the same time, the other end part 31b of the main guide shaft 31 is fitted into the mating hole 24a, and the other end part 32b of the auxiliary guide shaft 32 is fitted into the mating hole 24b. Also, the first positioning pin 23a is fitted into the first positioning hole 12a, and the second positioning pin 23b is fitted into the second positioning hole 12b. Further, the leading end of the lead screw 60 is caused to enter the depression 26.

Then, the screws B are tightened into the screw holes 13 through the cutouts 25. This combines the cover 20 with the base 10, thereby completing the assembling of the apparatus as a whole.

The above-mentioned assembling can elongate the main guide shaft 31 and auxiliary guide shaft 32 in parallel with the optical axis L while preventing them from tilting. As a result, the apparatus can be assembled with a high precision, so that the lens frame 40 (lens G) is moved along the optical axis L with a high precision. The foregoing can yield a lens drive apparatus with high optical performances.

About Operations of the Apparatus

Operations of the apparatus will now be explained.

First, when the lens frame 40 is located (at the initial position) on the rear side of the optical axis L, the detection sensor 90 detects the piece to be detected 45.

When the motor 50 rotates normally, the lead screw 60 rotates, so that the projection 72 is guided only along the optical axis L while being unrotatably kept by the guide groove 22a of the cover 20. As a result, a screw feeding action moves the nut 70 forward along the optical axis L.

Then, the urging force of the coil spring 80 moves the nut holding part 43 so as to make it follow the nut 70. Consequently, the lens frame 40 moves forward along the optical axis L together with the nut 70.

The number of steps from the starting of the motor 50 is counted, so as to control the driving amount of the lens frame 40 as appropriate, thereby positioning the lens frame 40 at a desirable position.

When the motor 50 rotates in reverse, on the other hand, the lead screw 60 rotates, so that the projection 72 is guided only along the optical axis L while being unrotatably kept by the guide groove 22a of the cover 20. As a result, a screw feeding action moves the nut 70 rearward along the optical axis L.

Then, the nut 70 pushes the nut holding part 43 against the urging force of the coil spring 80. As a consequence, the lens frame 40 moves rearward along the optical axis L together with the nut 70. Appropriately controlling the driving amount can position the lens frame 40 at a desirable position; the lens frame 40 can further be moved rearward so as to resume the initial position.

In this driving action, the main guide axis 31 and auxiliary guide axis 32 allow the lens frame 40 to move along the optical axis L smoothly with a high precision without sticking, chattering, and so forth while being inhibited from rotating about the main guide shaft 31.

Hence, this lens drive apparatus can drive the lens frame 40 (lens G) smoothly and stably with a high precision along the optical axis L without jouncing, tilting, sticking, vibrating, and so forth, even when the lens frame 40 is formed like a cantilever and constructed to hold the lens G on its free end side, while simplifying the structure, making the apparatus smaller, and so forth.

Therefore, when this lens drive apparatus is employed as an aberration correction/beam expander unit in an optical pickup unit or the like, for example, the optical axis does not fluctuate even during driving the lens frame 40, whereby high optical performances can be obtained.

Though the above-mentioned embodiment illustrates one lens frame 40 as a lens frame moving along the optical axis L, this is not restrictive; the present invention can be employed in a structure comprising a plurality of lens frames. In this case, one guide groove may be used in common, or respective guide grooves may be provided for the lens frames.

As explained in the foregoing, the lens drive apparatus in accordance with the present invention can reliably assemble the lens frame 40 (lens G) while positioning it with a high precision so as to be able to drive it smoothly and stably with a high precision along the optical axis L without jouncing, tilting, sticking, vibrating, and so forth, even when the lens frame 40 is formed like a cantilever and constructed to hold the lens G on its free end side, while simplifying the structure, making the apparatus smaller, and so forth. Therefore, the lens drive apparatus of the present invention is not only employable in optical pickup units and the like, but also useful in other lens optical systems.

The invention claimed is:

1. A lens drive apparatus comprising:
   a base;
   a lens frame for holding a lens;
   a driving source secured to said base;
   a lead screw configured to be driven by said driving source so as to rotate;
   a nut threadably engaged with said lead screw and held unrotatably and movably with said lens frame;
   a main guide shaft having a first end part secured to said base so as to guide said lens frame along an optical axis, and having a second end part;
   an auxiliary guide shaft having a first end part secured to said base so as to guide said lens frame along said optical axis while inhibiting said lens frame from rotating about said main guide shaft, and having a second end part; and a cover, arranged so as to oppose said base, and being configured to mate with and secure said second end parts of said main and auxiliary guide shafts;

wherein said lens frame has a lens holding part configured to hold said lens on a free end side projecting from an outer contour defined by said base and said cover;

wherein, for positioning said base and said cover with respect to each other upon assembling, one of said base and said cover has a first positioning pin disposed near said main guide shaft and a second positioning pin disposed at a position distanced farther from said main guide shaft than said first positioning pin;

wherein the other of said base and said cover has a first positioning hole arranged and configured to mate with said first positioning pin and a second positioning hole arranged and configured to mate with said second positioning pin;

wherein said lens frame includes a mating part configured to slidably mate with said main guide shaft, an engaging part configured to slidably engage said auxiliary guide shaft, and said lens holding part formed on a side opposite from said engaging part so as to hold said mating part in a direction intersecting the optical axis; and wherein said mating part is formed such that a length thereof along said main guide shaft is longer than a distance from a center of said main guide shaft to a center of said lens being held by said lens holding part.

2. A lens drive apparatus according to claim 1, wherein said second positioning pin and said second positioning hole are disposed near said auxiliary guide shaft.

3. A lens drive apparatus according to claim 2, wherein said lead screw is arranged between said main guide shaft and said auxiliary guide shaft.

4. A lens drive apparatus according to claim 1, wherein said lens holding part is formed so as to position a center of sad lens on or near a line connecting a center of said mating part and a center of said engaging part within a plane intersecting the optical axis.

5. A lens drive apparatus according to claim 4, wherein said lead screw is arranged between said main guide shaft and said auxiliary guide shaft.

6. A lens drive apparatus according to claim 1, wherein said lead screw is arranged between said main guide shaft and said auxiliary guide shaft.

7. A lens drive apparatus according to claim 6, wherein said lead screw is arranged such that a center thereof is positioned on or near a line connecting a center of said mating part and a center of said engaging part within a plane intersecting the optical axis.

8. A lens drive apparatus according to claim 7, wherein said lead screw is directly connected to said driving source.

9. A lens drive apparatus according to claim 6, wherein said lead screw is directly connected to said driving source.

* * * * *